April 18, 1961 W. M. GRUBER ET AL 2,980,331
DETERMINATION OF DYNAMIC UNBALANCE
Filed May 3, 1956 3 Sheets-Sheet 2
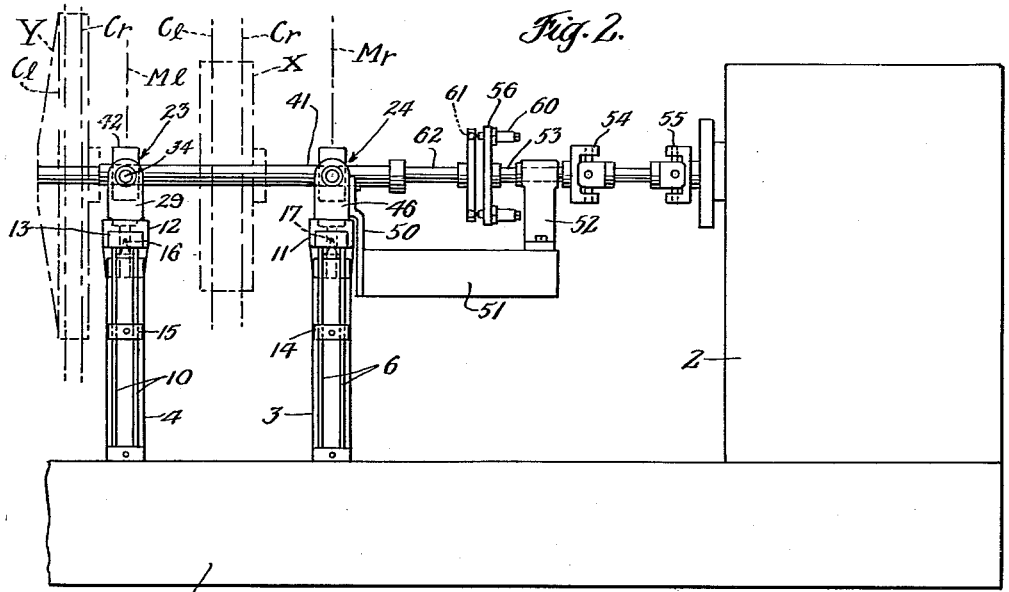
Fig. 2.
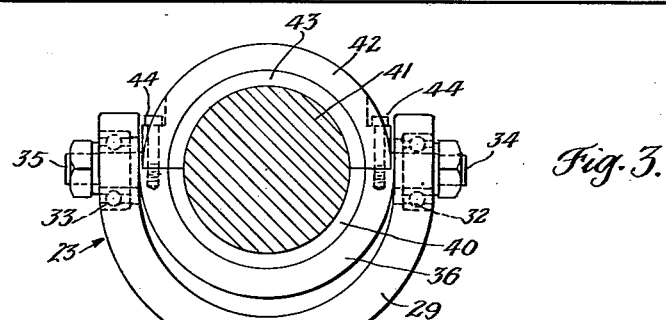
Fig. 3.
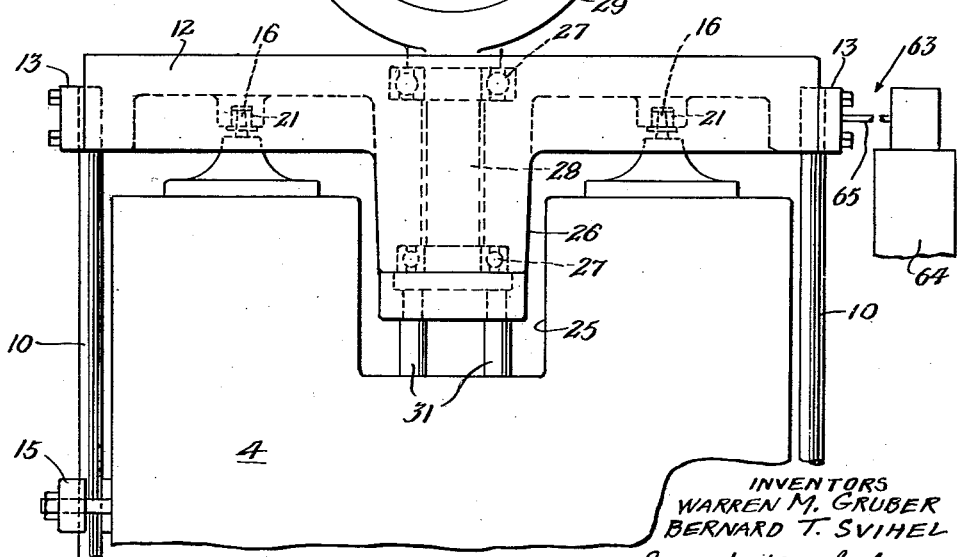
INVENTORS
WARREN M. GRUBER
BERNARD T. SVIHEL
Synnestvedt + Lechner
ATTORNEYS

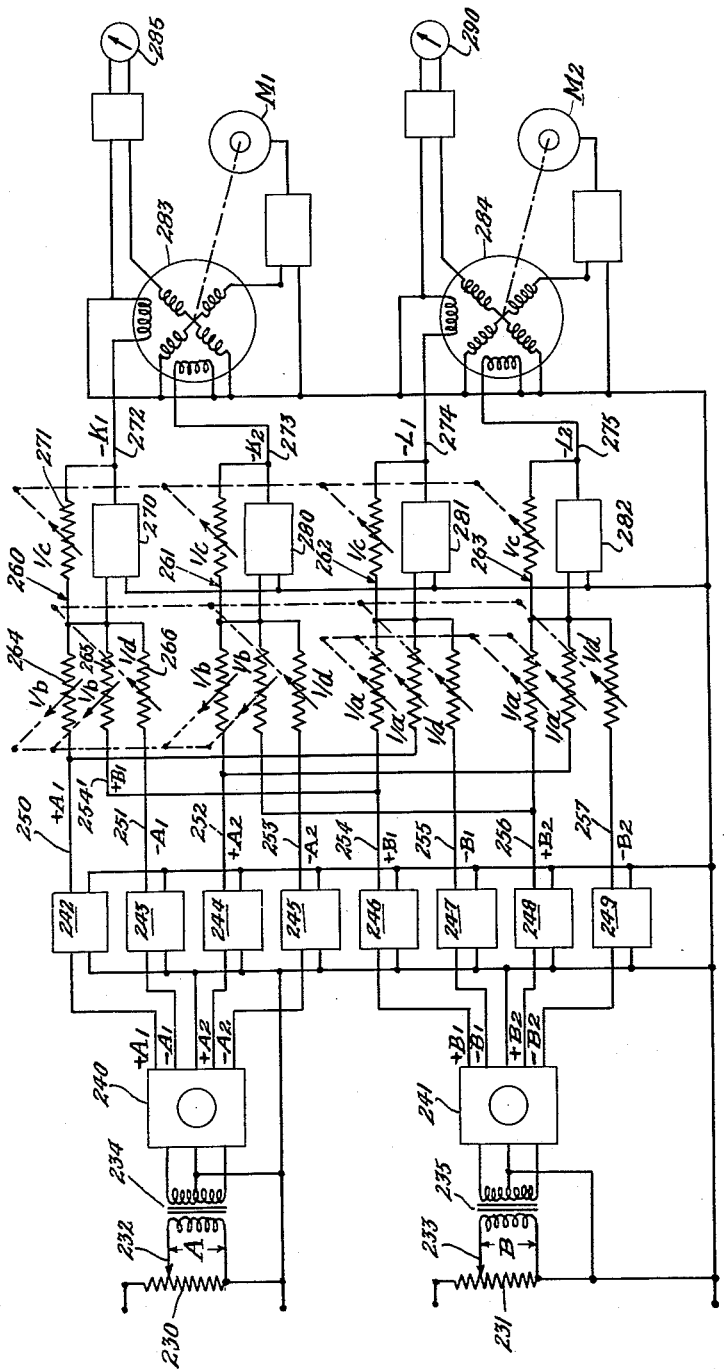

United States Patent Office 2,980,331
Patented Apr. 18, 1961

2,980,331

DETERMINATION OF DYNAMIC UNBALANCE

Warren M. Gruber, Horsham, and Bernard T. Svihel, Croyden, Pa., assignors to Tinius Olsen Testing Machine Company, Willow Grove, Pa., a corporation of Pennsylvania Filed May 3, 1956, Ser. No. 582,487

7 Claims. (Cl. 235—189)

This invention relates to the determination of dynamic unbalance in rotatable articles.

Dynamic unbalance in a rotating body is due to the force couple set up by the unbalanced distribution of weight and is usually evidenced by the vibration of the body on its supporting bearings. Correction is ordinarily afforded by finding the amount and location of unbalance in two correction planes spaced from one another along the rotational axis of the body and then adding or removing weight so, in effect, to form a couple equal and opposite to that causing the original unbalance.

In determining unbalance, an article is rotatably mounted in a balancing machine cradle arranged on elastic supports so as to have a single degree of freedom of motion in each of the correction planes. The unbalance causes the cradle and article to vibrate, and the amount and location of unbalance in each correction plane is measured. In determining the unbalance in one correction plane, it is, of course, necessary that the effect of unbalance in the other plane be compensated for or be eliminated. This is usually done by providing pivots for the correction planes so that the cradle can vibrate only in one correction plane at a time.

Most articles whose dynamic unbalance is to be determined permit pivotal supporting as mentioned above. However, in many instances, the shape of the article is such that it is impractical to provide pivots in the planes of correction so that it is impossible, from a pivoting standpoint, to eliminate the effects of unbalance in one plane while the unbalance in the other is being measured. The present invention provides apparatus for the determination of unbalance in articles of the type last mentioned and proposes an arrangement wherein pivots are provided in planes other than the correction planes, measuring the unbalance preferably in these other planes (hereinafter called measurement planes) and then feeding te unbalance information to a device which computes the unbalance in the correction plane so that weight can be added or removed.

The manner in which the foregoing is accomplished will be apparent from the following description and drawings wherein:

Figure 2 is a side elevational view illustrating a balancing machine, the cradle of which is pivoted in planes other than in the correction planes of the article;

Figure 3 is a fragmentary view of certain of the parts of Figure 2;

Figure 4 is a circuit diagram illustrating one embodiment of apparatus for computing the unbalance in the correction planes; and Figure 5 is a circuit diagram illustrating another embodiment of apparatus for computing the unbalance in the correction planes.

Figure 1:
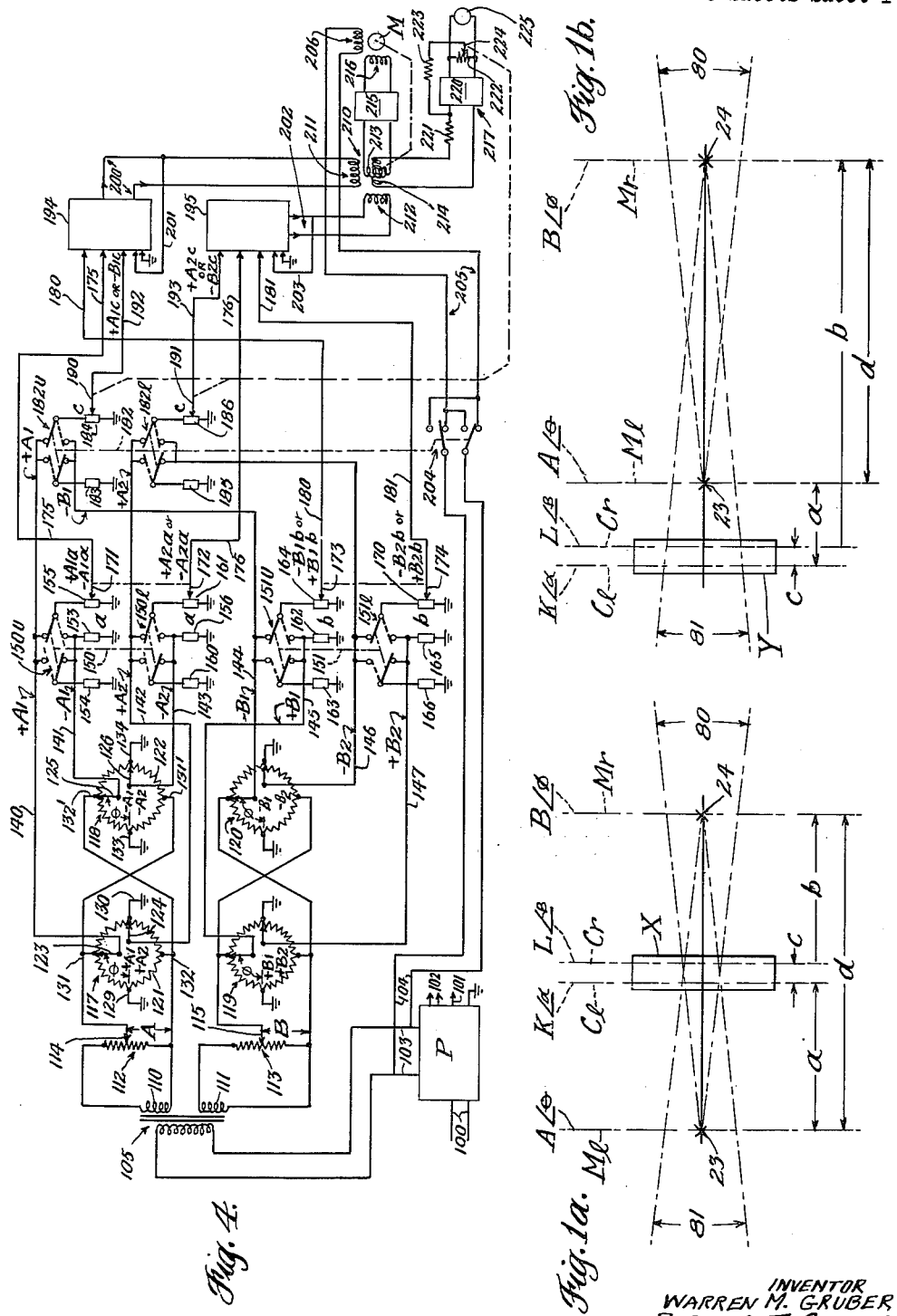
Figures 1a and 1b are diagrammatic representations of articles supported other than in correction planes and illustrating in particular certain unbalance moments.

In Figure 2 the balancing machine comprises a base 1 supporting a housing 2, which encloses apparatus for automatically determining unbalance as disclosed in copending application of John Reed Stovall, Jr. and Irving Weintraub, Serial No. 233,294, filed June 25, 1951, now Patent No. 2,783,648. While other systems or apparatus for determining unbalance may be used in connection with the present invention, the apparatus disclosed in said application is preferred. On the base 1 are mounted pedestals 3 and 4, which are axially adjustable to accommodate articles of different lengths. Mounted at opposite ends of each pedestal are pairs of elastic rods or supports, one pair for pedestal 3 being indicated by the numeral 6 and a similar pair for pedestal 4 being indicated by the numeral 10. On the top of each pair of rods are cross supports 11 and 12 secured thereto by clamps, for example, the clamps 13—13 for the rods 10 as shown in Figure 3. Each pair of rods is provided with tuning means, for example, the clamps 14 and 15 which are slidably adjustable on the pedestals 3 and 4.

On the top of each pedestal is mounted a pair of locking pins, the locking pins 16—16 on top of the pedestal 4 being best seen in Figure 3. One of the locking pins 17 on the pedestal 3 is indicated in Figure 2. The locking pins are controlled by hydraulic or electric mechanism (not shown) so as to be disposed in apertures in the cross brackets, for example, the apertures 21—21 for the locking pins 16—16, or alternatively, the locking pins may be withdrawn from the apertures. When withdrawn, the cross member is free to vibrate on the elastic rods, for example, the cross member 12 can move from left to right as viewed in Figure 3. When the locking pins are within the apertures, the cross member is held fixed.

The cross member mounts swivel supports 23 and 24 for an article to be tested, and since both are identical, only the details for the support in the cross member 12 will be described. The pedestal 4 is provided with a central recess 25, which accommodates a downwardly extending portion 26 of the cross member 12. A pair of roller bearings 27—27 is mounted in the cross member and supports a vertically extending shaft 28. On the top of the shaft 28 is arranged a yoke 29. It will be apparent that the bearing arrangement permits the shaft and yoke to swivel in a horizontal plane relative to the cross member. On the bottom of the portion 26 are disposed two paddles 31—31 which extend downwardly into a reservoir of oil (not shown) in the pedestal. The paddles and oil provide for the dampening of the vibration of the cross member 12. The yoke 29 carries a pair of roller bearings 32 and 33 which support the shafts 34 and 35 of a lower frame 36. The frame 36 carries a bush-type bearing 40. The shaft 41 of an article to be tested is disposed in the bushing 40. An upper frame 42 having a bush-type bearing 43 surrounds the top half of the shaft and is secured to the lower frame by the screws 44—44. The bushing provides for the shaft to be rotatable therein.

As best seen in Figure 2, the yoke 46 of the support 24 carries a bracket 50 mounting a beam 51 carrying at its end an axially adjustable upright bearing 52. This bearing carries a drive shaft 53 which is connected by universal joints 54 and 55 to driving mechanism (not shown) within the housing 2. On the end of the shaft 53 is a coupling 56 having a plurality of drive pins 60 which are adapted to be inserted in apertures 61 in an adaptor 62 adapted to be fixed to the shaft 41.

Located in each of the transverse planes containing the swiveling axes of the supports are unbalance signal pickups preferably of the permanent magnet moving coil type, the magnet being supported on an upright and the coil being secured to a rod attached to a cross member. For example, as seen in Figure 3, the magnet for pickup 63 for the left-hand plane is mounted on pedestal 64 and the coil which operates within the magnet is secured to a rod 65 mounted on cross member 12.

It will be apparent from the above description that if the article to be tested is rotated, and say, the right-hand support 24 is free (by the locking pins being withdrawn) and the left-hand support 23 is locked or not free to vibrate (by its locking pins being inserted), unbalance will cause the cross member 11 and article to vibrate in a horizontal plane, the motion being accommodated by the flexing of the rods 6 and the shaft 28 allowing the support 23 to swivel. If the left-hand support 23 is free and the right-hand support 24 locked, the support 23 will vibrate, the motion being accommodated by the flexing of rods 10 and the swiveling of support 24. In either instance, of course, the universal joints 54 and 55 permit the required movement of the drive shaft 53, coupling 56, beam 51, etc.

As mentioned above, the pick-up 63 and the swivel axes of the supports lie in the same transverse plane. This plane is called herein the left measurement plane and is indicated by the dotted line $M_l$. The pick-up and the swivel axis of the support 24 lie in the right measurement plane $M_r$. When the support 23 is free to vibrate, the unbalance signal in the $M_l$ plane is developed by the pick-up 63 and when the support 24 is free to vibrate, the unbalance signal for the $M_r$ plane is developed by the other pick-up.

In Figure 2 we have diagrammatically illustrated two types of articles which are of a nature so as to be non-supportable at the pivots when correction is to be made. For example, the article X, which may be a turbine blade assembly, is arranged for testing inboard of the supports 23 and 24. The article Y, which may be a fan, is arranged outboard of the supports 23 and 24. The left and right correction planes for both articles are designated by $C_l$ and $C_r$.

For either type article, the unbalance (angle and amount) in both measurement planes is first measured and then the unbalance in the correction planes is determined or computed. The material which follows briefly describes the equations involved in this computation.

In Figure 1a with the support 23 locked and support 24 free, the article X will vibrate about 23 through the angle indicated at 80. With the support 24 locked and the support 23 free, the article will vibrate about 24 through the angle 81. It will be observed that in either instance the article is vibrating in both the right and left correction planes and in the corresponding measurement plane. The unbalance in the left correction plane can be represented by vector $K \angle \alpha$, in the right correction plane by vector $L \angle \beta$, and the unbalance measured in the measurement planes can be represented by vectors $A \angle \theta$ and $B \angle \phi$. K, L, A and B are quantities representing magnitudes of unbalance and their corresponding angles $\alpha$, $\beta$, $\theta$, and $\phi$ locate the respective vectors from a common reference plane, for example, a horizontal plane when the article is in a predetermined rotational position. It might be pointed out that the term horizontal refers to a reference plane and, therefore, is used in the generic sense, i.e., the reference point or plane may be horizontal or vertical or in some intermediate position. Indeed, if the rotational axis of the part to be tested is disposed in a vertical position, the reference plane will be correspondingly arranged. In the figure, $c$ represents the distance between correction planes, $a$ and $b$ the distances between respective measurement and correction planes, and $d$ the distance between measurement planes.

With support 24 free, (1) $\Sigma M_{23} = 0 = K \angle \alpha a + L \angle \beta(a+c) - B \angle \phi(a+b+c)$ With support 23 free, (2) $\Sigma M_{24} = 0 = K \angle \alpha(b+c) + L \angle \beta b - A \angle \theta(a+b+c)$ $K \angle \alpha = K_1 + jK_2$ where $K_1$ and $K_2$ are the 90° or horizontal and vertical components of unbalance. Also, $\alpha = \tan^{-1} K_2/K_1$. Also, $K_1 = K \cos \alpha$ and $K_2 = K \sin \alpha$. Similar equations can be written for L, A and B and their corresponding angles $\alpha$, $\theta$ and $\phi$. The solution for Equations 1 and 2 can be shown to be:

(3a) $K_1 = \dfrac{-B_1 b + A_1 a + A_1 c}{c}$ (3b) $K_2 = \dfrac{-B_2 b + A_2 a + A_2 c}{c}$ (3c) $L_1 = \dfrac{-A_1 a + B_1 b + B_1 c}{c}$ (3d) $L_2 = \dfrac{-A_2 a + B_2 b + B_2 c}{c}$ (4a) $K_1 = \dfrac{B_1 b - A_1 d + A_1 b}{c}$ (4b) $K_2 = \dfrac{B_2 b - A_2 d + A_2 b}{c}$ (4c) $L_1 = \dfrac{A_1 a - B_1 d + B_1 a}{c}$ (4d) $L_2 = \dfrac{A_2 a - B_2 d + B_2 a}{c}$ The Equations 3a, etc., 4a, etc., are termed hereinafter operating equations. Where the article is mounted outboard of the measurement plane, a similar analysis applies in determining the operating equations. In Figure 1b the article T is mounted outboard of the supports 23 and 24 and the same symbols as in Figure 1a are used to designate the correction planes, etc.

With support 24 free, (5) $\Sigma M_{23} = 0 = K \angle \alpha a + L \angle \beta(a-c) + B \angle \phi(d)$ With support 23 free, (6) $\Sigma M_{24} = 0 = K \angle \alpha(b+c) + L \angle \beta + b - A \angle \theta(d)$
$d = b - [(a-c)] = b - a + c$ The solution to Equations 5 and 6 can be shown to be:

(7a) $K_1 = \dfrac{-B_1 b - A_1 a + A_1 c}{c}$ (7b) $K_2 = \dfrac{-B_2 b - A_2 a + A_2 c}{c}$ (7c) $L_1 = \dfrac{A_1 a + B_1 b + B_1 c}{c}$ (7d) $L_2 = \dfrac{A_2 a + B_2 b + B_2 c}{c}$ With the above equations in mind, it is pointed out that the amount and angle of unbalance in each of the correction planes (for either type of article) is found by determining the amount and angle of unbalance in each of the measurement planes and resolving the vectors representing the same into horizontal and vertical components, performing the computation required by the particular operating equations selected to find the horizontal and vertical components in the correction plane and then resolving these latter components into resulting vectors. The value and angle of each resulting vector represents the magnitude and angle of unbalance in the respective correction planes.

The material which follows describes an embodiment for performing the above and adapted particularly for operating Equations 3a, 3b, 3c and 3d.

In the embodiment shown in Figure 4, a regulated power supply is generally designated by the letter P. This has a commercial 110-volt, 60-cycle input 100, B+ output 101, filament supply 102 and output lines 103. The output feeds lines 104 to supply a constant A.C. voltage to a servo motor which will be described later. The output lines supply a transformer 105, the secondaries 110 and 111 of which respectively supply constant A.C. voltage to the potentiometers 112 and 113.

The potentiometers are adapted to develop voltages respectively representing the magnitude of unbalance in the left and right measurement planes. The movable arm 114 of the potentiometer 112 is adapted to be adjusted in accordance with the amount of unbalance in the left measurement plane, while the movable arm 115 of the potentiometer 113 is adapted to be moved in accordance with the amount of unbalance in the right measurement plane. Thus, the output voltages of the potentiometers are in terms of volts per unit of variable, or represent or are proportional to the amount of unbalance in the respective measurement planes. The output voltages are labelled A and B.

The voltages A and B are fed to devices which develop voltages proportional to the respective horizontal and vertical components thereof. Preferably these devices take the form of non-linear potentiometers which operate to multiply the inputs thereto (A and B) by the sine and cosine of the respective angle of unbalance and thereby obtain the horizontal and vertical components. The voltage A is fed to the left potentiometers generally designated by 117 and 118, while the voltage B is fed to the right potentiometers generally designated by 119 and 120. The left and right potentiometers are arranged substantially identically, and the detailed description which follows covers the left potentiometers 117 and 118.

The potentiometer 117 has an annularly-arranged resistance 121 and the ganged arms 123 and 124, which are angularly spaced 90° from one another, are adapted to be rotated about the resistor. The potentiometer 118 has an annularly-arranged resistor 122 and the ganged arms 125 and 126, which are spaced 90° from one another, are adapted to be rotated about the resistor. The resistor 121 is center-tapped to ground as indicated at 129 and 130 and the input voltage A is symmetrically connected between taps as indicated at 131 and 132. The resistor 122 is also center-tapped as indicated at 133 and 134 and the input voltage A is symmetrically connected between taps as indicated at 131' and 132'.

The arms 123—124 and 125—126 are preferably ganged so as to be movable in unison about the respective resistors and are adapted to be moved in accordance with the angle of unbalance $\theta$ in the left measurement plane. In the position shown, the arms are set for an angle of 0° and when the arm 123 is at tap 130, it represents an angle of 90°. The voltage $A_1$ appearing on the arm 123 will be a function of the cosine of $\theta$ or $A_1 = A \cos \theta$, while the voltage $A_2$ appearing on arm 124 will be a function of the sine of $\theta$ or $A_2 = A \sin \theta$. As has been indicated hereinbefore, $A_1$ and $A_2$ represent the horizontal and vertical components of unbalance in the left measurement plane.

With reference to the Equations 3a, etc., 4a, etc., and 7a, etc., mentioned above, it will be noted that these require horizontal and vertical components of both positive and negative sign. Except as noted hereinafter, the negative voltages are provided by the potentiometer 118, since the voltage appearing on arm 125 is the same as, but displaced 180° from, the voltage of the arm 123, while the voltage on the arm 126 is the same as, but displaced 180° from, the voltage on the arm 124. These voltages on the arms 125 and 126 are respectively indicated as $-A_1$ and $-A_2$. The leads 140, 141, 142 and 143 from the potentiometers are indicated as having voltages $+A_1$, $-A_1$, $+A_2$ and $-A_2$.

The voltage B is fed to the potentiometers 119 and 120, which are arranged similarly as the potentiometers 117 and 118, but actuated in accordance with the angle $\phi$ in the right measurement plane, and the leads 144, 145, 146 and 147 are indicated as having voltages $-B_1$, $+B_1$, $-B_2$ and $+B_2$ respectively representing the horizontal and vertical components of unbalance in the right measurement plane.

The horizontal and vertical voltages for the potentiometer are fed to transfer switches generally designated by 150 and 151. These switches operate to condition the system alternatively for operation when articles such as X or Y are being tested. The details of construction follow.

Switch 150 has upper portion 150u and lower portion 150l and switch 151 has upper portion 151u and lower portion 151l. In the upper portion 150u of the switch 150, the two top terminals are interconnected to the line 140 having the voltage $+A_1$. The bottom terminals are interconnected to the line 141 carrying the voltage $-A_1$ and also interconnected to a resistor 153. The left-hand movable arm of the switch in interconnected to a resistor 154, while the right-hand movable arm of the switch is interconnected to a potentiometer 155. In the lower portion 150l, the two top terminals are interconnected to the line 142 carrying the voltage $+A_2$, while the lower terminals are interconnected to the line 143 carrying the voltage $-A_2$ and also interconnected to a resistor 156. The left-hand movable arm is interconnected to a resistor 160 and the right-hand movable arm is interconnected to a potentiometer 161.

In the upper portion 151u of the switch 151, the two top terminals are interconnected to the line 144 carrying the voltage $-B_1$. The lower terminals are interconnected to the line 145 carrying the voltage $+B_1$ and also interconnected to a resistor 162. The left-hand movable arm is interconnected to a resistor 163 and the right-hand movable arm is interconnected to a potentiometer 164. In the lower half 151l, the two top terminals are interconnected to the line 146 carrying the voltage $-B_2$. The lower terminals are interconnected to the line 147 carrying the voltage $+B_2$ and also to a resistor 165. The left-hand movable arm is interconnected to a resistor 166, while the right-hand movable arm is interconnected to a potentiometer 170. The position of the movable arms of the switches 150 and 151 shown in full lines conditions the system for operation when an article such as X is being tested, and when the arms are in the position shown by the dotted lines, the system is conditioned for operation when an article such as Y is being tested. The switches are ganged for simultaneous operation as is indicated.

With the right-hand movable arms of the switches 150 and 151 positioned as shown, it will be apparent that the voltage $A_1$ appears across the potentiometer 155, the voltage $A_2$ appears across the potentiometer 161, the voltage $-B_1$ appears across the potentiometer 164, and the voltage $-B_2$ appears across the potentiometer 170. These potentiometers are multipliers and perform the multiplying operations in accordance with the operating equations, i.e., respectively operate to multiply the horizontal and vertical components of the measurement planes by their distances to the correction planes.

Thus, the resistances of the potentiometers 155 and 161 are arranged so that the movable arms 171 and 172 can be set thereon in accordance with the distance $a$ between the left measurement and left correction planes. Therefore, the voltage appearing on the arm 171 is $+A_1a$ and the voltage on arm 172 is $+A_2a$. As indicated, these arms are arranged for simultaneous movement. The resistances of the potentiometers 164 and 170 are arranged so that the movable arms 173 and 174 can be set thereon in accordance with the distance $b$ between the right measurement plane and the right correction plane. Thus, the voltage appearing on the arm 173 is $-B_1b$ and the voltag on arm 174 is $-B_2b$.

With the left-hand arms of the transfer switches 150 and 151 in the position shown, it will be observed that the voltage $-A_1$ on the line 141 appears across the resistors 153 and 154, the voltage $-A_2$ on the line 143 appears across the resistors 156 and 160, the voltage $+B_1$ on the line 145 appears across the resistors 162 and 163, and the voltage $+B_2$ on the line 147 appears across the resistors 165 and 166. The purpose of these resistors is to maintain the output impedance on the potentiometers 117, 118, 119 and 120 substantially constant as between the operational positions of the switches.

Before proceeding, the effect of actuating the transfer switches 150 and 151 for operating with a Y-type article will be mentioned.

With the right-hand movable arms of the transfer switches in the position shown by the dotted lines, it will be apparent that the voltage $-A_1$ on line 141 is across the potentiometer 155, the voltage $-A_2$ on line 143 is across the potentiometer 161, the voltage $+B_1$ on line 145 is across the potentiometer 164, and the voltage $+B_2$ on the line 147 is across the potentiometer 170. Therefore, the voltage on arm 171 is $-A_1a$, the voltage on arm 172 is $-A_2a$, the voltage on arm 173 is $+B_1b$, and the voltage on arm 174 is $+B_2b$.

In view of the above, it will be observed that, depending on the position of the switches 150 and 151, the lines 175, 176, 180 and 181 connected to arms 171, 172, 173 and 174 will alternatively have the voltages as indicated.

In connection with keeping the output impedance of the potentiometers 117, 118, 119 and 120 constant, the following should be noted. The dotted line position of the right side arms of switches 150 and 151 throws resistances 153, 156, 162 and 165 across the potentiometers as interconnected by the lines 141, 143, 145 and 147. Also, the dotted line position of the left-hand arms throws resistances 154, 160, 163 and 166 across the potentiometers as interconnected by the lines 140, 142, 144 and 146. Preferably the resistances 153, 154, 155, 156, 160, 161, 162, 163, 164, 165, 166 and 170 are of substantially equal value.

Returning now to operation of the system with the transfer switch set for operation with an X-type article:

The left and right plane switch 182 sets up the system for multiplying certain of the horizontal and vertical components of the measurement planes by the distance $c$ separating the correction planes as required by the operational equations. The details of construction of this switch and its operation follow.

The switch has an upper portion 182$u$ and a lower portion 182$l$. In the upper portion, the upper terminals are connected to line 140 carrying voltage $+A_1$, while the lower terminals are connected to line 144 carrying the voltage $-B_1$. The left-hand movable arm connects a resistor 183 to the upper or lower terminals, depending upon whether it is in the position as shown or in the dotted line position. The right-hand movable arm connects a potentiometer 184 to the upper or lower terminals, depending on whether it is in the position as shown or in the dotted line position.

In the lower portion, the upper terminals are connected to line 142 carrying voltage $+A_2$, while the lower terminals are connected to the line 146 carrying voltage $-B_2$. The left-hand movable arm connects a resistor 185 to the upper or lower terminals, depending upon whether it is in the position shown or in the dotted line position. The right-hand movable arm connects a potentiometer 186 to the upper or lower terminals, depending upon whether it is in the position shown or in the dotted line position.

The resistors 183 and 185 are used in conjunction with the resistors 153, etc., of transfer switches 150 and 151 for maintaining proper impedance across the potentiometers 117, etc.

The positions of the movable arms of the plane switch 182 as shown by full lines are for operation in the left plane while the positions shown by the dotted lines are for operation in the right plane. As indicated, the movable arms are ganged for simultaneous operation.

The potentiometers 184 and 186 are multipliers, i.e., the resistances of the potentiometers are arranged so that when the movable arms 190 and 191 are set in accordance with the distance between correction planes, the voltage on an arm is equal to the voltage across the resistances times the distance $c$.

Thus, when the switch 182 is set for the left plane, the voltage $+A_1$ appears across the potentiometer 184 and the voltage on the movable arm 190 is $+A_1c$ and the voltage $+A_2$ appears across the potentiometer 186 and the voltage on the arm 191 is $+A_2c$. When the switch is set for the right plane, the voltage $-B_1$ appears on the potentiometer 184 and the voltage on the arm 190 is $-B_1c$ and the voltage $-B_2$ appears on the potentiometer 186 and the voltage on the arm 191 is $-B_2c$.

In summary then, the lines 192 and 193 connected to the arms 190 and 191 carry, depending on the position of switch 182, voltage $+A_1c$ or $-B_1c$ and $+A_2c$ or $-B_2c$ as is indicated.

The next operation is to algebraically sum the voltages or products mentioned above. This is preferably done by horizontal and vertical summing amplifiers generally designated by 194 and 195.

These summing amplifiers are preferably high gain amplifiers with a feedback loop, the operation of which is well understood in the art and need not be described in detail. The following should suffice for present purposes. The input to the horizontal amplifier is from lines 180, 175 and 192. The output of this amplifier is designated as 200 and the feedback circuit generally indicated at 201. In the vertical summing amplifier, the input is from lines 193, 176 and 181. The output of the amplifier is designated by 202 and the feedback circuit generally indicated at 203.

With the plane switch 182 in the position for the left plane, the input to the horizontal amplifier is $-B_1b$, $+A_1a$, $+A_1c$, while the input to the vertical amplifier is $-B_2b$, $+A_2a$, $+A_2c$. By an inspection of operating Equations 3a and 3b, it will be seen that the above inputs are the same as the numerator of these equations.

With the plane switch 182 in the position for the right plane, the input to the horizontal amplifier is $+A_1a$, $-B_1b$, $-B_1c$, while the input to the vertical amplifier is $+A_2a$, $-B_2b$, $-B_2c$. By an inspection of the operating Equations 3c and 3d, it will be seen that the above inputs are the same as the numerators of these equations except for signs. The change in sign of the inputs from that required by the operating equations is compensated for by the switch 204 ganged to the plane switch 182. When the plane switch is set for the left plane as shown, the switch 204 feeds the voltage from the power supply through line 205 to the reference phase 206 of a servo motor M. However, when the switch 204 is set for right plane operation, the switch 204 is actuated and the voltage feed to the reference phase 206 is of the opposite instantaneous polarity or 180° out of phase. This phase shift compensates for the sign change of the inputs in the operation of a component solver generally designated by 210 as will be observed hereinafter.

The purpose of the component solver 210 is to find the vector sum of the outputs of the summing amplifiers and to indicate the angle or orientation of the resultant from the reference or horizontal plane mentioned heretofore. The solver has two stator windings 211 and 212 respectively connected to the output lines 200 and 202 of the horizontal and vertical summing amplifiers. These windings are in 90° space quadrature. Two rotor windings 213 and 214 are oriented at 90° to one another, the winding 213 being connected to servo amplifier 215 feeding the control coil 216 of the servo motor M. The winding 214 feeds a dividing circuit 217, the purpose of which will be explained below. The servo motor M is connected to the rotor windings 213 and 214 and rotates the same.

The outputs of the summing amplifiers fed to the component solver are in phase inasmuch as there is no phase shifting in the system as between the transformer secondaries 110—111 and the summing amplifier outputs. Also, these voltages will be in or out of phase with the phase of the voltage across servo motor coil 206, depending on the position of the switch 204. The magnitudes of the outputs of the vertical and horizontal amplifiers usually will differ, depending on the values of unbalance.

The component solver 210 may be a standard commercial design, the operation of which is known to those skilled in the art, and the following will suffice for present purposes.

In the component solver, the windings are distributed in the various stator and rotor slots in such a manner as to obtain true sinusoidal relationship between output voltages and of rotor rotation. Thus, the general equations for the solver 210 are $e_{213}=e_{211} \cos \delta - e_{212} \sin \delta$, and $e_{214}=e_{212} \cos \delta + e_{211} \sin \delta$, where $\delta$ is the angular position of the rotor winding from some known point. If $e_{213}$ is made zero, then $$e_{214}=\sqrt{e_{211}^2+e_{212}^2}$$

and $$\delta=\tan^{-1}\frac{e_{212}}{e_{211}}$$

This angle $\delta$ then is the angle of unbalance ($\alpha$ or $\beta$) in the left or right correction planes, depending on the position of switch 182. Also, with reference to Equations 3a, 3b, 4a and 4b, it will be noted that the complete solution requires a division operation by $c$, the distance between correction planes. In other words, the voltage appearing across the coils 214 is the vector sum of the stator inputs but does not represent the $\bar{K}$ or $\bar{L}$ (the vectors in the correction planes) until divided by $c$. This is done by the circuit 217.

This circuit may be of standard design comprising an amplifier 220, input resistor 221, output potentiometer 222 and feedback loop including resistor 223. The circuit is arranged so that when the movable arm 224 is set in accordance with the distance $c$ between correction planes, the output voltage is reduced or divided by this factor. The meter 225 connects to the output of the dividing circuit, then indicates the amount of unbalance in the left or right planes, depending on the position of switch 182. Preferably the arm 224 is ganged to the arms 190 and 191 as indicated.

When a Y-type article is to be tested, the operation of the device is the same as above described. However, the switches 182 and 186 are actuated as mentioned heretofore so that the proper voltage will be fed to the horizontal and vertical summing amplifiers. Also, the various distances $a_1$, $b_1$ and $c$ are set up as required. No further explanation need be given for the operation, as this will be apparent from a comparison of operating Equations 7a—7d with the circuitry of Figure 4.

Another embodiment of the invention is shown in Figure 5. This apparatus is for use particularly with operating Equations 4a—4d. A brief explanation follows.

The embodiment shown in Figure 5 is arranged somewhat differently than that described in connection with Figure 4, particularly in the sense that the determination of unbalance in each of the correction planes is accomplished simultaneously rather than switching from plane to plane (by switch 182). Other differences will be noted as the description proceeds.

The potentiometers 230 and 231 are adapted to be supplied with constant A.C. voltages by a power supply similar to that mentioned in connection with Figure 4, and operate in a similar manner. The arm 232 of potentiometer 230 and the arm 233 of potentiometer 231 are respectively adjusted in accordance with the amount of unbalance in the left and right measurement planes. The output voltages A and B are fed through isolating transformers 234 and 235 to potentiometers generally designated by 240 and 241, which resolve the input voltage into horizontal and vertical components similarly as described in connection with the potentiometers 117, etc. The potentiometer 240 is operated in accordance with the angle $\theta$, while the potentiometer 241 is operated in accordance with the angle $\phi$.

As indicated, the output lines of the potentiometers 240 and 241 carry voltages $+A_1$, etc., and $+B_1$, etc., which are fed to isolating amplifiers 242, 243, 244, 245, 246, 247, 248 and 249. The purpose of these amplifiers is to maintain the output impedance of the potentiometers 240 and 241 substantially constant. The output lines 250—257 of the amplifiers 242—249 carry voltages $+A_1$, etc., and $+B_1$, etc.

These output lines are connected to a group of summing and dividing networks generally designated by 260—263. These networks are similar in form and explanation will be made only in connection with unit 260. This comprises resistors 264, 265 and 266 connected to the lines 250, 254' and 251, which make up the input to an amplifier 270 having a feedback loop including resistor 271. The general equation for such a network is $E_0=R_f[E_1/R_1+E_2/R_2+\ldots E_n/R_n]$ where $E_0$ is the output voltage, $E_1$, $E_2$, etc., are input voltages, $R_f$ is the feedback resistor and $R_1$, $R_2$, etc., are the input resistances. By making $R_f=1/c$, $E_1$, $E_2$, etc., the appropriate horizontal and vertical components and $R_1$, $R_2$, etc., the reciprocal of the appropriate distances $a$, $b$, $c$, $d$, the operating Equations 7a—7d can be solved.

Thus, in network 260, the input resistors 264 and 265 are proportional to $1/b$, the input resistor 266 is proportional to $1/d$, and the feedback resistor 270 is proportional to $1/c$. Also, it will be noted that the lines 250, 254' and 251 carry voltages $+A_1$, $+B_1$ and $-A_1$. By substituting these in the general equation:

$$E_0=\frac{1}{c}\left[\frac{+A_1}{\frac{1}{b}}+\frac{+B_1}{\frac{1}{b}}+\frac{-A_1}{\frac{1}{d}}\right] \text{ or }$$

$$E_0=-\left[\frac{+A_1b+B_1b-A_1d}{c}\right]$$

which, it will be noted, is the same as Equation 4a except for the sign. The line 272, which is the output line of amplifier 270 carries voltage $-K_1$. The output lines 273, 274 and 275 carry voltages $-K_2$, $-L_1$ and $-L_2$.

In the amplifiers 280, 281 and 282 for the networks 261, 262 and 263, the feedback resistances are proportional to $1/c$, as is indicated, and the respective input resistances are proportional to the required $1/b$, $1/a$ and $1/d$ factors as is also indicated. Also, these input resistors are interconnected as shown to the amplifiers 244—249 to receive the proper component voltages therefrom.

The voltages $-K_1$ and $-K_2$ on lines 272 and 273 are fed to the left correction plane component solver 283, while the voltages $-L_1$ and $-L_2$ on planes 274 and 275 are fed to the right correction plane component solver 284. These component solvers operate in a manner as described in connection with the solver 210 of Figure 4. The amount of unbalance K in the left correction plane is indicated by the meter 285, while the angle $\alpha$ is indicated by the position of the solver rotor or by the servo $M_1$. The amount of unbalance L in the right correction plane is indicated by the meter 290, while the angle $\beta$ is indicated by the position of the solver rotor or by the servo $M_2$.

We claim:

1. In a balancing machine having means for determining for each of two measurement planes of an article the amount and the angle of unbalance with respect to a reference plane, a computer for determining the amount and angle of unbalance in two corresponding correction planes comprising: means to develop voltages representing respectively the amount of unbalance in said measurement planes means receiving said voltages and operative as a function of the respective angles of unbalance of said measurement planes to develop respectively for said measurement planes voltages representing 90° components of unbalance; mechanism for each correction plane for determining the value of the 90° components of each measurement plane in the corresponding correction planes and developing voltages in accordance therewith; and means selectively responsive to the voltages of said mechanism to determine respectively for each correction plane the magnitude and angle of the vector sum of the voltages representing the 90° components of unbalance therein.

2. In a balancing machine having means to determine for a measurement plane of an article the amount and the angle of unbalance with respect to a reference plane, a computer for determining the angle and amount of unbalance in a correction plane comprising: means to develop for said plane a voltage representing the amount of unbalance; electrical circuit means receiving said voltage to develop voltages corresponding to the 90° components of unbalance in said measurement plane; means responsive to last said voltages to develop voltages proportional to the value of the 90° components of unbalance in a plane of correction spaced from said plane of measurement; and means to obtain the amount and angle of unbalance for said correction plane including mechanism to vectorially add last said voltages.

3. In a balancing machine having means to determine for left and right measurement planes of an article the amount and the angle of unbalance with respect to a reference plane, a computer for determining the amount and angle of unbalance in a left and right measurement plane, the combination comprising: means to develop voltages representing respectively the amount of unbalance in said left and right measurement planes means receiving said voltages and operative as a function of the respective angles of unbalance in said measurement planes to develop respectively for said measurement planes voltages representing the 90° components of unbalance; mechanism for determining the value of the 90° components of the left measurement plane in the left correction plane and developing voltages in accordance therewith; mechanism for determining the value of the 90° components of the right measurement plane in the right correction plane and developing voltages in accordance therewith; and means operative for each correction plane and responsive to the voltages of said mechanisms to determine respectively the magnitude and the angle of the vector sum thereof.

4. In a balancing machine having means for determining for each of two measurement planes of an article the amount and the angle of unbalance with respect to a reference plane, a computer for determining the amount and angle of unbalance in two correction planes comprising: means to develop voltages representing respectively the amount of unbalance in each said measurement plane means receiving said voltages and operative as a function of the respective angles of unbalance of said measurement planes to develop respectively for said measurement planes voltages representing the 90° components of unbalance; mechanism for each correction plane for determining the value of the 90° components of each measurement plane in the corresponding correction planes and developing voltages in accordance therewith; means responsive to last said voltages and operative for each correction plane for determining the vector sum of the voltages representing the 90° components of unbalance therein; and means operative for each correction plane for indicating the magnitude and angle of the respective vector sums.

5. In a balancing machine having means for determining for left and right measurement planes of an article the amount and angle of unbalance with respect to a reference plane, a computer for determining the amount and angle of unbalance in two correction planes comprising: means to develop voltages representing respectively the amount of unbalance in said left and right measurement planes means receiving said voltages and operative as a function of the respective angles of unbalance of said left and right measurement planes to develop respectively for said measurement planes voltages representing the 90° components of unbalance; first mechanism for determining the value of the 90° components of the left measurement plane in the left correction plane and developing voltages in accordance therewith; second mechanism for determining the value of the 90° components of the right measurement plane in the right correction plane and developing voltages in accordance therewith; means responsive to the voltages of said first mechanism to determine the magnitude and angle of the vector sum thereof; and means responsive to the voltages of said second mechanism to determine the magnitude and angle of the vector sum thereof.

6. In a balancing machine having means for determining for each of two measurement planes of an article the amount and angle of unbalance with respect to a reference plane, a computer for determining the amount and angle of unbalance in two correction planes comprising: means to independently develop for each said measurement plane, a voltage representing the amount of unbalance of the articles; means to develop respectively from said measurement voltages, voltages representing the 90° components of unbalance; mechanism for each correction plane effective to multiply the voltage representing one component of each measurement plane respectively by quantities representing the respective distances to the correction plane wherein values are not being determined and effective to multiply the voltage representing the other component of each measurement plane respectively by quantities representing the respective distances to the correction plane wherein values are not being determined; means operative for both correction planes to receive the multiplied said one component voltages and to algebraically sum the same and develop an output voltage in accordance with the sum and to receive the multiplied said other component voltages and algebraically sum the same and develop an output voltage in accordance with the sum; means connected to receive said output voltages and develop an output signal proportional to the vector sum thereof including means to indicate the arc-tangent of the ratio of the outputs; means to receive last said signal and divide the same by a quantity representing the distance between correction planes; and mechanism to indicate last said quotient.

7. In a balancing machine having means for determining for left and right measurement planes of an article the amount and angle of unbalance with respect to a reference plane, a computer for determining the amount and angle of unbalance in two correction planes comprising: means to develop a voltage representing the magnitude of unbalance in said left measurement plane; means to develop a voltage representing the magnitude of unbalance in said right measurement plane; means to multiply said magnitude voltage of the left measurement plane by the sine and cosine of the angle of unbalance in the left measurement plane and develop output voltages in accordance therewith, last said output voltages representing 90° components of unbalance; means to multiply said magnitude voltage of the right measurement plane by the sine and cosine of the angle of unbalance of the right correction plane and develop output voltages in accordance therewith, last said output voltages representing 90° components of unbalance; mechanism for determining the value of the cosine component of the left measurement plane in the left correction plane including means to multiply the cosine component of the right measurement plane by its distance to the right correction plane, to multiply the cosine component of the left measurement plane by its distance from the left correction plane and by the distance between correction planes and thereby develop three left cosine voltages; mechanism for determining the value of the sine component of the left measurement plane in the left correction plane including means to multiply the sine component in the right measurement plane by its distance to the right correction plane, to multiply the sine component in the left measurement plane by its distance from the left correction plane and by the distance between correction planes and thereby develop three left sine voltages; mechanism for determining the value of the cosine component of the right measurement plane in the right correction plane including means to multiply the cosine component in the left measurement plane by its distance to the left correction plane, to multiply the cosine component in the right measurement plane by its distance from the right correction plane and by the distance between correction planes and thereby develop three right cosine voltages; mechanism for determining the value of the sine component of the right measurement plane in the right correction plane including means to multiply the sine component in the left measurement plane by its distance to the left correction plane, to multiply the sine component in the right measurement plane by its distance from the right correction plane and by the distance between correction planes and thereby develop three right sine voltages; first summing means to sum a plurality of voltages fed thereto and develop an output voltage in accordance therewith; second summing means adapted to sum a plurality of voltages fed thereto and develop an output voltage in accordance therewith; mechanism alternatively operable to feed said three left cosine voltages to said first summing means and said three left sine voltages to said second summing means or to feed said three right cosine voltages to said first summing means and said three right sine voltages to said second summing means; mechanism connected to said summing means to receive the respective output voltages therefrom and to develop an output signal proportional to the vector sum of the outputs including means to indicate the arc-tangent of the ratio of the outputs; means to receive last said output signals and divide the same by a quantity representing distance between correction planes; and means to indicate last said quotient.

References Cited in the file of this patent

UNITED STATES PATENTS

| | | |
|---|---|---|
| 2,289,074 | Rushing | July 7, 1942 |
| 2,315,578 | Baker | Apr. 6, 1943 |
| 2,532,158 | Ewing | Nov. 28, 1950 |
| 2,608,856 | Van Degrift | Sept. 2, 1952 |
| 2,710,723 | Nettleton | June 14, 1955 |
| 2,730,899 | Hellar | Jan. 17, 1956 |
| 2,731,834 | Fehr et al. | Jan. 24, 1956 |
| 2,783,648 | Stovall | Mar. 5, 1957 |
| 2,828,911 | Lash | Apr. 1, 1958 |

FOREIGN PATENTS

| | | |
|---|---|---|
| 666,898 | Great Britain | Feb. 20, 1952 |
| 688,234 | Great Britain | Mar. 4, 1953 |

OTHER REFERENCES

Pages 52–56, Elements of Mechanical Vibration by Freberg and Kemler. Published 1947 by Wiley.